United States Patent
Thorsell et al.

(10) Patent No.: US 9,120,433 B1
(45) Date of Patent: Sep. 1, 2015

(54) SELF-ALIGNING TRIM STRIPS FOR VEHICLE INSTRUMENT PANEL ASSEMBLIES

(71) Applicant: Toyota Motor Engineering & Manufacturing North America, Inc., Erlanger, KY (US)

(72) Inventors: Roy Thorsell, Wixom, MI (US); Brian Thurgate, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/219,423

(22) Filed: Mar. 19, 2014

(51) Int. Cl.
*B60R 13/00* (2006.01)
*B60R 13/02* (2006.01)

(52) U.S. Cl.
CPC .................... *B60R 13/0206* (2013.01)

(58) Field of Classification Search
CPC ................................. B60R 13/0206
USPC ............................ 296/70, 1.08; 454/152, 162
See application file for complete search history.

(56) References Cited

U.S. PATENT DOCUMENTS

| | | | |
|---|---|---|---|
| 5,502,942 A | 4/1996 | Gras et al. | |
| 5,786,047 A | 7/1998 | Tomblin | |
| 5,829,195 A | 11/1998 | Ojanen | |
| 6,142,254 A | 11/2000 | Claybaugh et al. | |
| 2003/0083006 A1* | 5/2003 | Brancheriau et al. | 454/155 |
| 2006/0057349 A1 | 3/2006 | Neitzke et al. | |
| 2007/0272476 A1 | 11/2007 | Huang | |
| 2008/0315612 A1* | 12/2008 | D'Alessandro | 296/72 |
| 2011/0316405 A1 | 12/2011 | Fink et al. | |
| 2014/0370797 A1* | 12/2014 | Beau et al. | 454/152 |

* cited by examiner

Primary Examiner — Joseph D Pape
(74) Attorney, Agent, or Firm — Dinsmore & Shohl LLP

(57) ABSTRACT

A trim strip for lining an opening of an interior panel for a vehicle includes a first trim segment having a panel engaging side and an exposed side. A second trim segment extends outwardly from the first trim segment at a first end of the first trim segment. The second trim segment has a panel engaging side and an exposed side. A third trim segment extends outwardly from the first trim segment at a second, opposite end of the first trim segment. The third trim segment has a panel engaging side and an exposed side. A detachable support member is connected to the second trim segment along a first line of weakness and to the third trim segment along a second line of weakness. The detachable support member includes a datum member arranged and configured to be engaged by a panel datum member during installation of the trim strip at the opening to align and maintain spacing between the second and third trim segments. The detachable support member is removable from the first and second trim segments along the first and second lines of weakness.

20 Claims, 7 Drawing Sheets

SELF-ALIGNING TRIM STRIPS FOR VEHICLE INSTRUMENT PANEL ASSEMBLIES

TECHNICAL FIELD

The present specification generally relates to trim strips provided along openings in instrument panel assemblies and, more particularly, to a self-aligning trim strip for a vehicle instrument panel assembly and methods of installing the self-aligning trim strip.

BACKGROUND

Instrument panels for vehicles are generally configured with a variety of openings that accommodate different finish options and accessories that may be selected by the consumer. An accessory may be installed in an opening of the instrument panel and a bezel, accessory panel or trim strip inserted in or along the opening to obscure the accessory attachment points and provide a transition between the surface of the instrument panel and the accessory. The bezel, accessory panel or trim strip may generally be secured to the instrument panel using clips which connect with a corresponding fastener located in the opening in the instrument panel. When the bezel, accessory panel or trim strip is connected to the instrument panel about the entire opening, unintended movement of the bezel, accessory panel or trim strip may be inhibited during and after installation. However, when an opening in an instrument panel is located along an edge or edges of the instrument panel, a bezel, accessory panel or trim strip inserted into or about the opening may not be bound by the instrument panel along the entire perimeter of the opening. Further, when a bezel or trim strip extends about only a portion of the opening, excessive movement of the bezel or trim strip may occur during and/or after installation causing an undesirable gap between the bezel or trim strip and the instrument panel.

SUMMARY

In one embodiment, a method of installing a trim strip along an opening in an interior panel for a vehicle is provided. The method includes positioning the trim strip adjacent an opening in the interior panel. The trim strip includes a first trim segment having a panel engaging side and an exposed side, a second trim segment extends outwardly from the first trim segment at a first end of the first trim segment, the second trim segment having a panel engaging side and an exposed side and a third trim segment extends outwardly from the first trim segment at a second, opposite end of the first trim segment. The third trim segment has a panel engaging side and an exposed side. A detachable support member is connected to the second trim segment along a first line of weakness and to the third trim segment along a second line of weakness. The detachable support member includes a datum member arranged and configured to be engaged by a panel datum member. The datum member of the detachable support member is engaged with a panel datum member thereby aligning the detachable support member relative to the opening. Spacing of the second and third trim segments is controlled using the detachable support member while affixing the panel engaging sides of the first, second and third trim segments along sides of the opening. The detachable support member is removed from the second and third trim segments with the first, second and third trim segments remaining affixed along sides of the opening thereby providing a side of the opening without a trim segment.

In another embodiment, a trim strip for lining an opening of an interior panel for a vehicle includes a first trim segment having a panel engaging side and an exposed side. A second trim segment extends outwardly from the first trim segment at a first end of the first trim segment. The second trim segment has a panel engaging side and an exposed side. A third trim segment extends outwardly from the first trim segment at a second, opposite end of the first trim segment. The third trim segment has a panel engaging side and an exposed side. A detachable support member is connected to the second trim segment along a first line of weakness and to the third trim segment along a second line of weakness. The detachable support member includes a datum member arranged and configured to be engaged by a panel datum member during installation of the trim strip at the opening to align and maintain spacing between the second and third trim segments. The detachable support member is removable from the first and second trim segments along the first and second lines of weakness.

In another embodiment, a method of installing a trim strip along an opening in an interior panel for a vehicle is provided. The method includes positioning the trim strip in a recessed ledge adjacent an opening in the interior panel. The trim strip includes a first trim segment having a panel engaging side and an exposed side, a second trim segment extends outwardly from the first trim segment at a first end of the first trim segment, the second trim segment having a panel engaging side and an exposed side and a third trim segment extends outwardly from the first trim segment at a second, opposite end of the first trim segment, the third trim segment having a panel engaging side and an exposed side. A detachable support member is connected to the second trim segment along a first line of weakness and to the third trim segment along a second line of weakness. The panel engaging side of the first trim segment is engaged with the recessed ledge. The recessed ledge includes a reinforcement feature comprising an outwardly extending rib supporting the first trim segment along the panel engaging side of the first trim segment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to self-aligning trim strips for vehicle instrument panel assemblies and methods of installing the self-aligning trim strips. The self-aligning trim strips may be used, for example, around an opening housing a speaker or other device. The self-aligning trim strips include a first trim segment, a second trim segment extending outwardly from the first trim segment at a first end of the first trim segment and a third trim segment extending outwardly from the first trim segment at a second, opposite end of the first trim segment. Prior to installation, a detachable support member is connected to the second and third trim segments at lines of weakness so that the detachable support member can be removed after installation of the self-aligning trim strip. The detachable support member can control spacing of the second and third trim segments while installing the self-aligning trim strip before being removed. A datum member may be provided to align the detachable support member relative to the opening.

Figure 1:
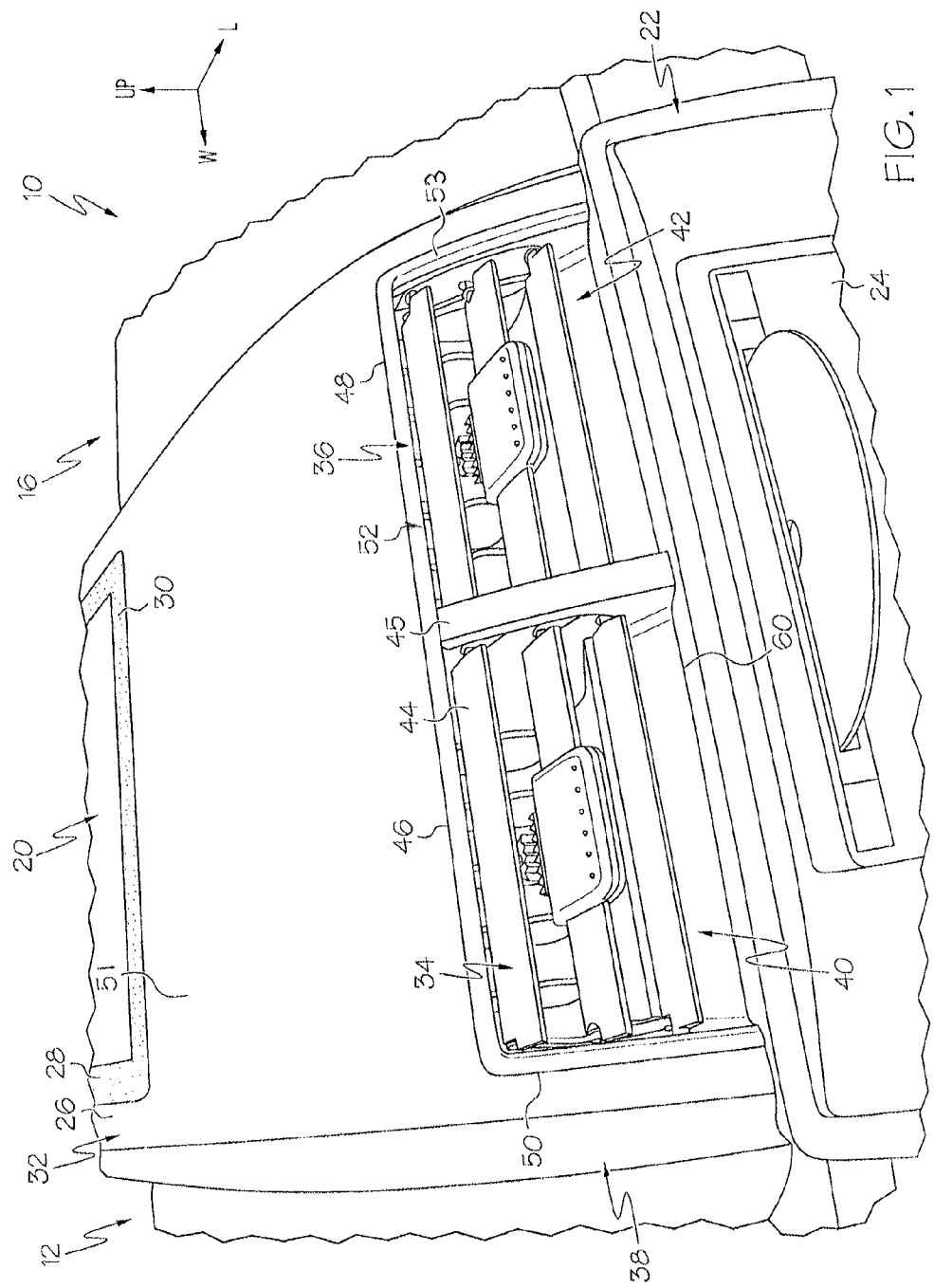
FIG. 1 is a perspective view of an instrument panel assembly according to one or more embodiments described herein.

Referring to FIG. 1, an instrument panel assembly (sometimes referred to as a dashboard), generally illustrated at element 10, is located at a front portion of a passenger compartment of a vehicle. The instrument panel assembly 10 generally extends in the vehicle widthwise direction W, between A-pillars and includes an instrument panel portion 12 with an instrument cluster and steering wheel at the driver's side of the vehicle, a storage compartment portion 16 with a storage or glove compartment located at the passenger's side of the vehicle and a central portion 20 where HVAC and radio controls 22 and a display 24 are located. An interior panel 26 is also located at the central portion 20 of the instrument panel assembly 10. A speaker 28 may be mounted within a speaker opening 30 in a roof-facing hood portion 32 of the interior panel 26 that extends generally in a vehicle lengthwise direction L toward the front of the instrument panel assembly 10.

Located in vent openings 34 and 36 in a rear-facing dash portion 38 of the interior panel 26 are HVAC vent assemblies 40 and 42. The vent assemblies 40 and 42 each include a number of adjustable vanes 44 that control and distribute conditioned or unconditioned air flowing from an HVAC system. The vent openings 34 and 36 are separated by a divider 45 formed by the interior panel 26. A recessed ledge 46 extends about a top 48 and outboard sides 50 and 53 of the vent openings 34 and 36. The recessed ledge 46 is recessed forward of a broad outer surface 51 of the interior panel 26. A trim strip 52 is received by the recessed ledge 46. The trim strip 52 extends continuously along the outboard sides 50 and 53 and top 58 of both vent openings 34 and 36. However, the trim strip 52 is open-ended in that the trim strip 52 does not extend along a bottom 60 of the vent openings 34 and 36. As will be described below, before installation, the trim strip 52 is self-aligning and includes a detachable support member that is used to maintain shape of the trim strip 52 during installation.

Figure 2:
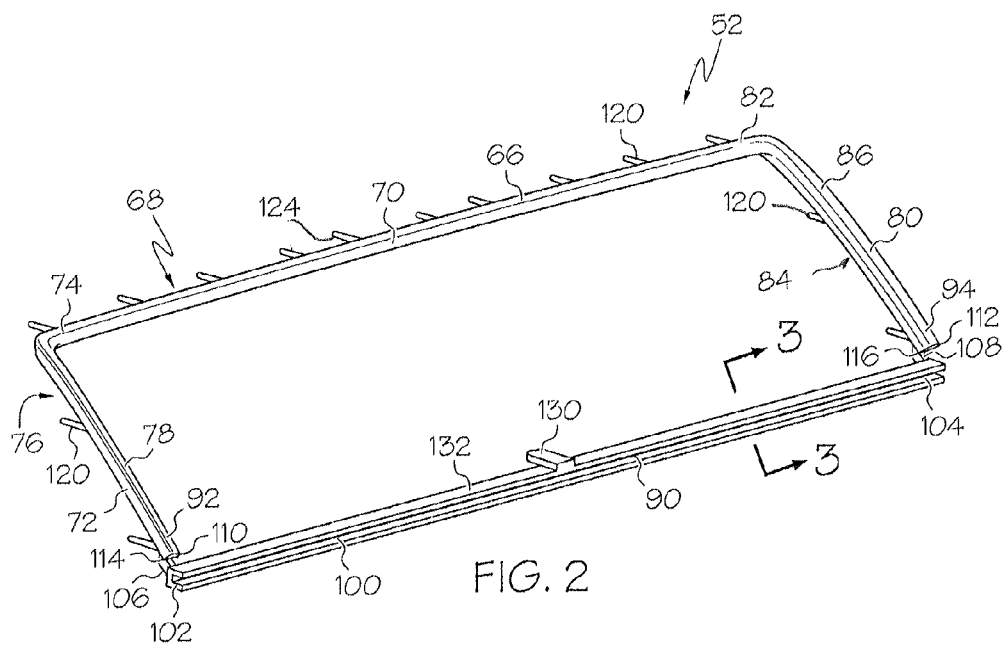
FIG. 2 is a perspective view of a self-aligning trim strip according to one or more embodiments described herein.

Referring to FIG. 2, the self-aligning trim strip 52 is shown in isolation and prior to installation in an installation configuration. The self-aligning trim strip 52 includes a first trim segment 66 having a panel engaging side 68 and an exposed side 70. A second trim segment 72 is formed integrally with and extends outwardly from an end 74 of the first trim segment 66. The second trim segment 72 has a panel engaging side 76 and an exposed side 78. A third trim segment 80 is formed integrally with and extends outwardly from an opposite end 82 of the first trim segment 66. The third trim segment 80 has a panel engaging side 84 and an exposed side 86.

Figure 3:
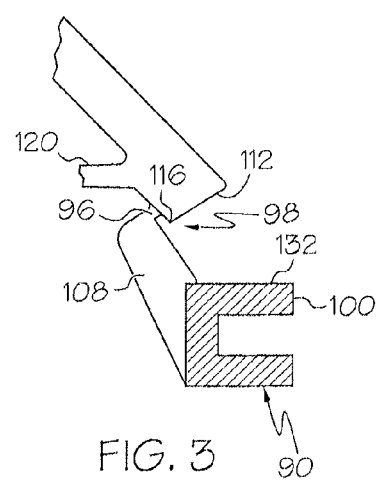
FIG. 3 is a section view of the self aligning trim strip along line 3-3 of FIG. 2 according to one or more embodiments described herein.

A detachable support member 90 is connected to the second trim segment 72 and third trim segment 80 at their respective ends 92 and 94. Referring also to FIG. 3, the detachable support member 90 is connected to each of the second trim segment 72 and third trim segment 80 at a line of weakness 96. In this embodiment, the line of weakness 96 may be formed by a necked-down region 98 of material having decreased thickness. The detachable support member 90 includes a bridge member 100, which in the illustrated example, is U-shaped that extends between the second and third trim segments 72 and 80 to ends 102 and 104 and connecting arm members 106 and 108 that connect to the second and third trim segments 72 and 80 at their lines of weakness 96.

As can be seen, the lines of weakness 96 are connected at the ends 92 and 94 of the second and third trim segments 72 and 80, spaced from their end surfaces 110 and 112. Such an offset arrangement can provide a flush end surface 110, 112 once the detachable support member 90 is removed or broke away from the second and third trim segments 72 and 80. Edges 114 and 116 of the second and third trim segments 72 and 80 can also provide a fulcrum that aids in rupturing along the lines of weakness 96 to detach the detachable support member 90. The lines of weakness 96 facilitate rupturing or breaking away of the detachable support member 90, e.g., by hand, in a predictable manner. While the bridge member 100 is illustrated as being U-shaped in section, any suitable shape may be used, such as square, round, etc. The bridge member 100 is of sufficient rigidity to maintain spacing between the second and third trim segments 72 and 80 during installation.

The first, second and third trim segments 66, 72 and 80 are provided with a number of staking projections 120. In the illustrated example, the first trim segment 66 includes staking projections 120 (e.g., 10 staking projections) extending outwardly from the panel engaging side 68 and spaced-apart from each other in the vehicle widthwise direction. The second and third trim segments 72 and 80 include staking projections 120 (e.g., two staking projections) extending outwardly from their panel engaging sides 76 and 84 and spaced-apart from each other in the vehicle front-to-rear direction. The number of staking projections 120 used for each trim segment 66, 72 and 80 can be more or less than the numbers illustrated and may depend, for example, on the size of the self-aligning trim strip 52.

A datum member 124 may extend outwardly from the panel engaging side 68 of the first trim segment 66. The datum member 124 may be located somewhat centrally on the first trim segment 66 and may also be a staking projection. In some embodiments, the datum member 124 is a staking projection having a length measured from the panel engaging side 68 that is greater than that of the adjacent staking projections 120 of the first trim segment 66. Such an increased length arrangement for the datum member 124 can allow the datum member 124 to engage the interior panel 26 first, which can be used to align the self-aligning trim strip 52 and the other staking projections 120 at the same time.

Another datum member 130 may be provided for the detachable support member 90. The datum member 130 may be formed as a projection that extends outwardly from a top surface 132 of the bridge member 100. The datum member 130 may be located somewhat centrally on the bridge member 100 to be removably received within a panel datum member, such as a slot provided by the interior panel 26, as will be described in greater detail below.

Figure 4:
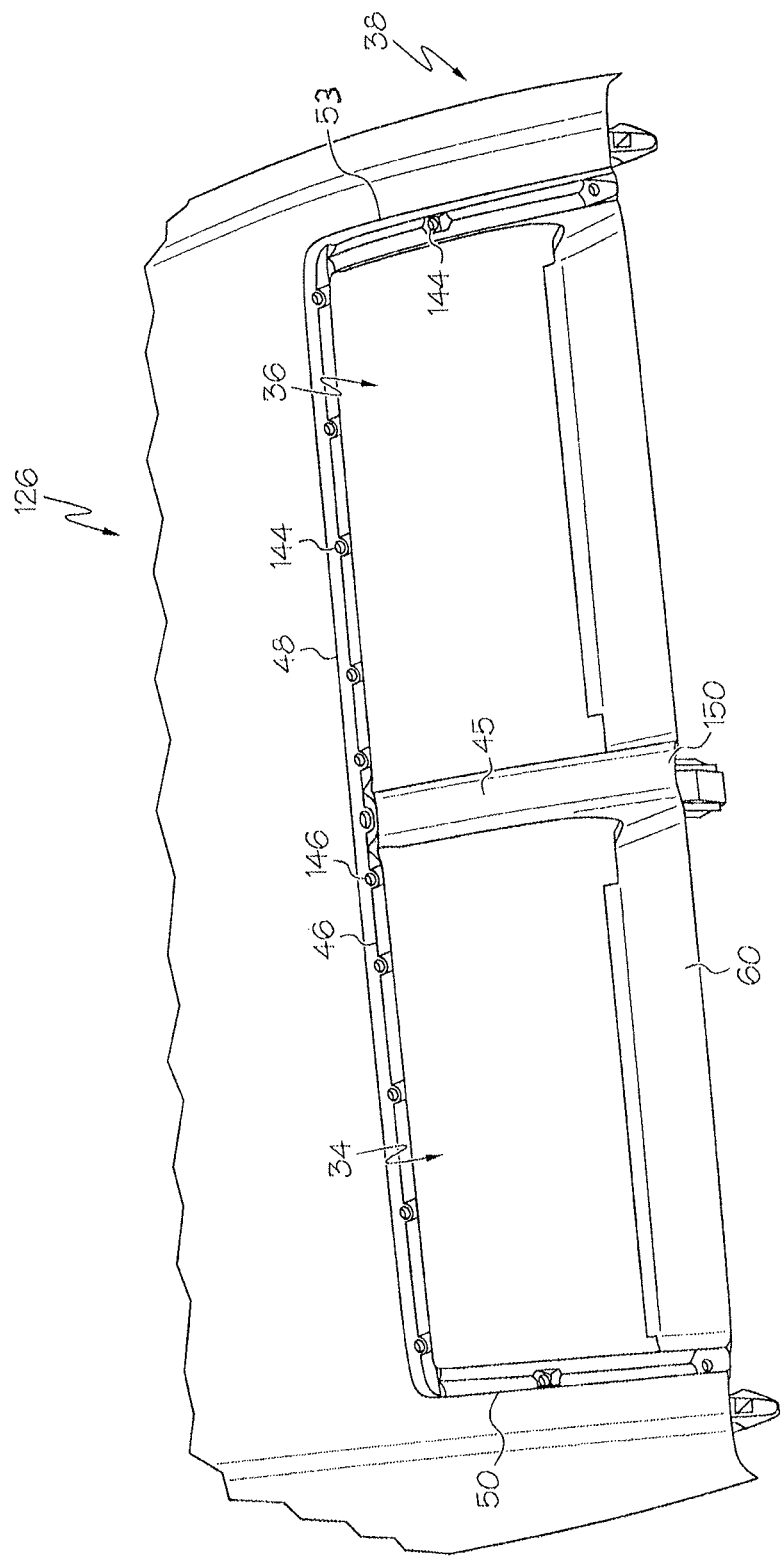
FIG. 4 illustrates an interior panel for use with the instrument panel assembly of FIG. 1 in isolation without the self-aligning trim strip according to one or more embodiments described herein.

Referring briefly to FIG. 4, the interior panel 26 is illustrated in isolation without the self-aligning trim strip 52. As indicated above, the interior panel 26 includes vent openings 34 and 36 in the rear-facing dash portion 38 that are separated by the divider 45. The recessed ledge 46 extends along the top 48 and outboard sides 50 and 53 of the vent openings 34 and 36. The recessed ledge 46 includes openings 144 that are sized and positioned to receive the staking projections 120 along the top 48 and outboard sides 50 and 53 of the vent openings 34 and 36. A panel datum member, such as opening 146 may be sized and positioned to receive the datum member 124 before any of the other openings 144 receive their staking projections 120 to allow an installer to adjust the position of the self aligning trim strip 52. The panel datum member, such as slot 150 may be provided at the bottom 60 of the vent openings 34 and 36 that is sized and positioned to removably receive the datum member 130 thereby aligning the self-aligning trim strip 52 for a staking operation.

Figure 5:
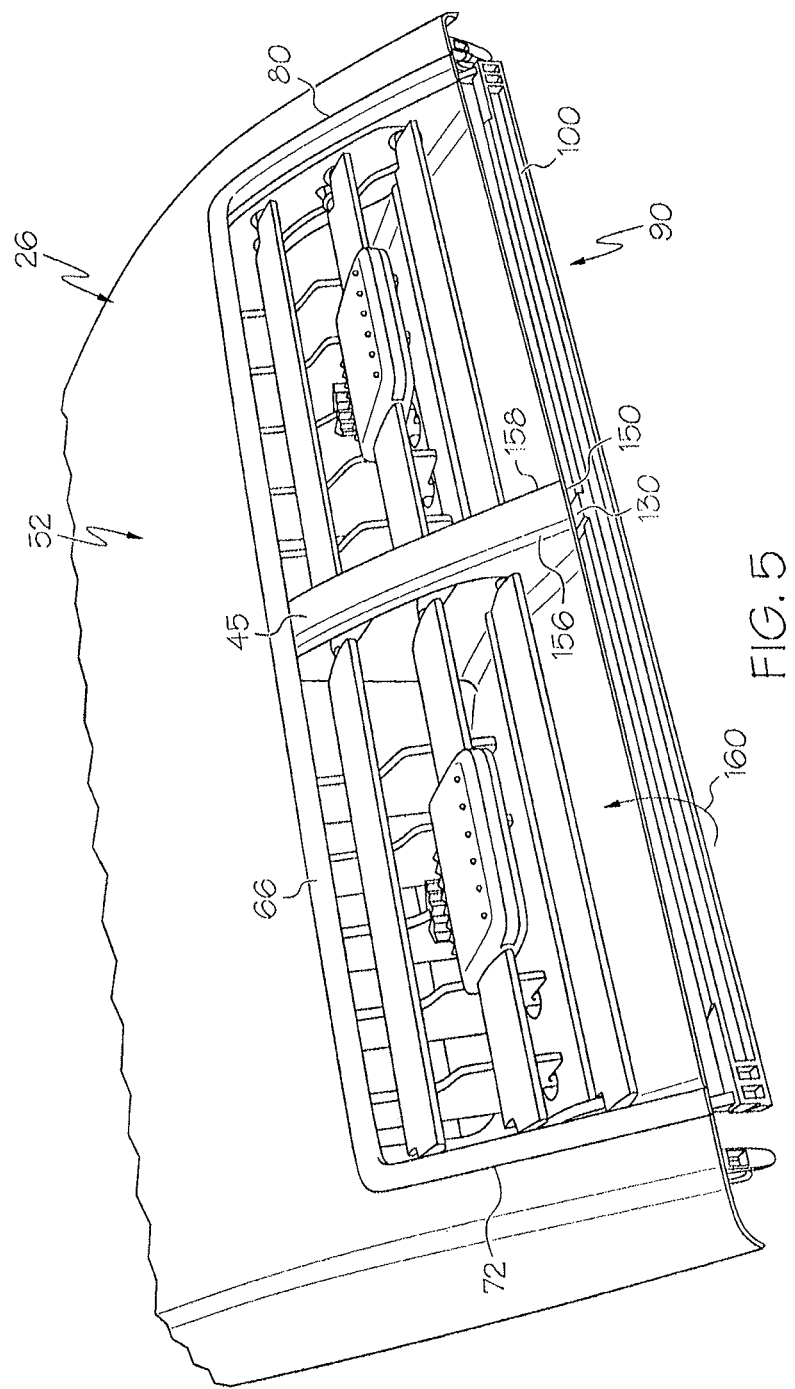
FIG. 5 is a perspective view of the interior panel of FIG. 4 with the self-aligning trim strip according to one or more embodiments described herein.
Figure 6:
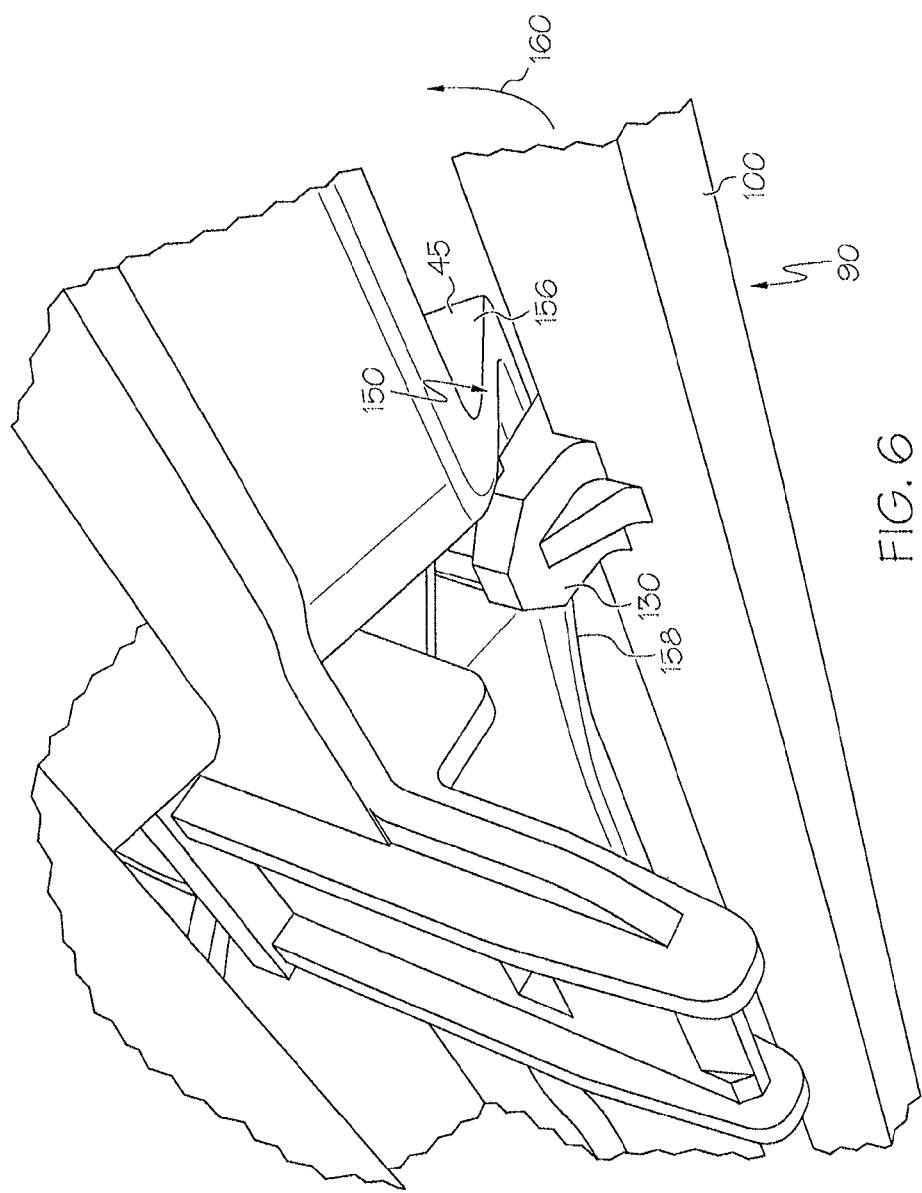
FIG. 6 is a bottom, detail view of the interior panel with self aligning trim strip of FIG. 5 according to one or more embodiments described herein.

Referring to FIGS. 5 and 6, with the staking projections 120 (FIG. 2) received by their associated openings 144 and the datum member 124 received by opening 146 (FIG. 4), the datum member 130 can be removably received by the slot 150. The engagement of the datum member 124 within the opening 146 can be used to align the staking projections 120 with the associated openings 144. The engagement of the datum member 130 with the slot 150 can be used to maintain spacing of the second and third trim segments 72 and 80 during, for example, a heat staking operation where the staking projections 120 are heat staked to the interior panel 26. In some embodiments, the slot 150 is provided by the divider 45 having sidewalls 156 and 158 that can be used to engage the datum member 130. Once the staking projections 120 are heat staked thereby connecting the self-aligning trim strip 52 to the interior panel 26, the detachable support member 90 may be moved in the direction of arrow 160 to move the datum member 130 from the slot 150, rupture the necked-down regions 98 of material having decreased thickness and to detach the detachable support member 90 from the first and second trim segments 72 and 80 (FIG. 1).

Figure 7:
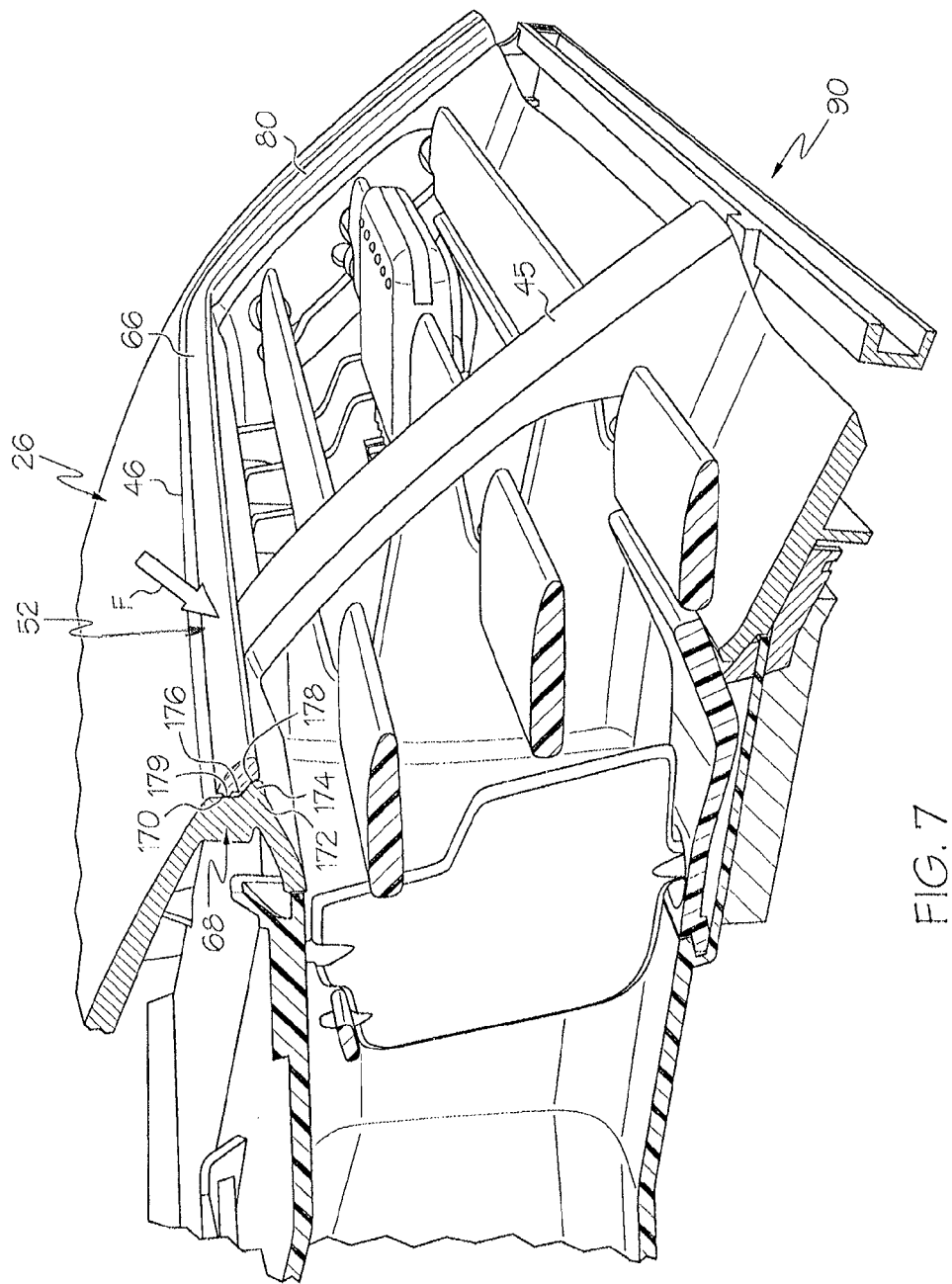
FIG. 7 is a side, section view of the interior panel with self aligning trim strip of FIG. 5 according to one or more embodiments described herein.

Referring to FIG. 7, the recessed ledge 46 and the panel engaging side 68 of the first trim segment 66 have reinforcement features that inhibit breakage of the self-aligning trim strip 52, for example, due to a forward and downward impact (e.g., in the direction of arrow F) to the first trim segment 66. The recessed ledge 46 includes a relatively vertical, vehicle widthwise extending portion 170 and a relatively horizontal vehicle widthwise extending portion 172 formed as a somewhat rounded rib 174 that extends widthwise along the recessed ledge 46. As can be seen the vertical and horizontal portions 170 and 172 form a somewhat L-shaped receiving location for the panel engaging side 68 of the first trim segment 66. The panel engaging side 68 includes a relatively vertical, vehicle widthwise extending portion 176 and a relatively horizontal, vehicle widthwise extending portion 178 that may be contoured to matingly receive the rounded rib 174 of the recessed ledge 46. A ridge 179 may be provided on the relatively vertical portion 176 that engages the vertical portion 170 of the recessed ledge 46 to reduce surface contact therebetween. In another embodiment, the ridge may be provided along the vertical portion 170 of the recessed ledge 46. The contours of the recessed ledge 46 and the panel engaging side 68 of the first trim segment 66 when a force F is applied, aid in transferring the impact force to the interior panel 26, instead of being absorbed by the self-aligning trim strip 52. Further, the ridge 179 can lower contact area, which can reduce unintended noise during operation of the vehicle, can ease tuning of the self-aligning trim strip 52 and can provide for a better appearance by creating a more even gap between the recessed ledge 46 and the panel engaging side 68 of the first trim segment 66. Small variations in a gap width (e.g., ±0.2 mm) in a 0.5 mm gap, for example, can be more difficult to detect visually than width variations in a zero width gap.

Figure 8:
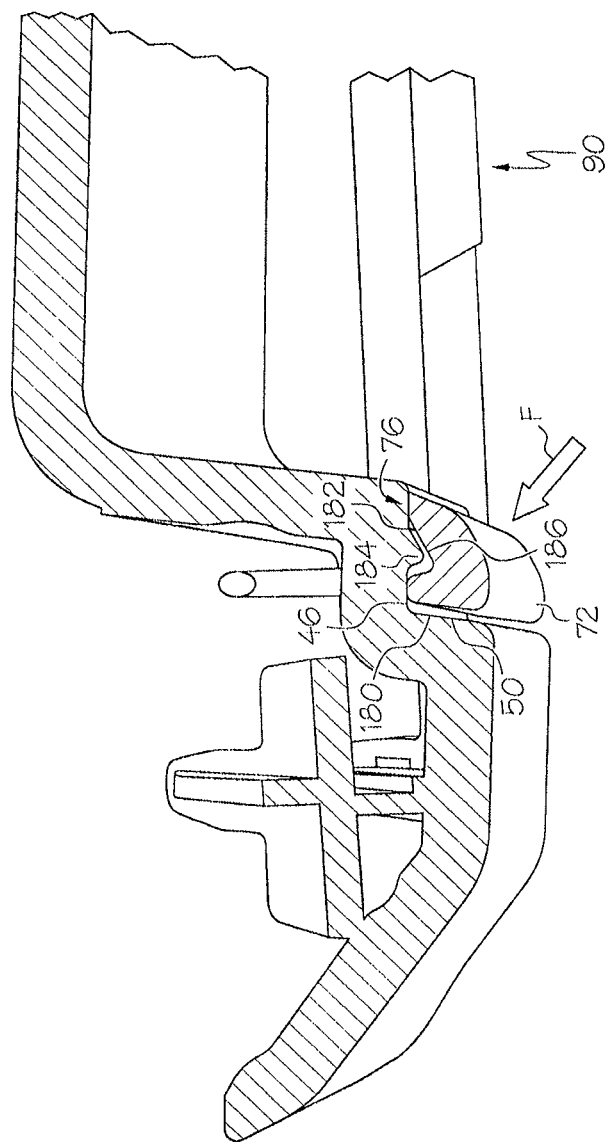
FIG. 8 is a top, section view of the interior panel with self aligning trim strip of FIG. 5 according to one or more embodiments described herein.

Referring to FIG. 8, the recessed ledge 46 and the panel engaging sides 76 and 84 of the second and third trim segments 72 and 80 also may have reinforcement features that inhibit breakage of the self-aligning trim strip 52, for example, due to a somewhat widthwise applied impact (e.g., in the direction of arrow F) to the second or third trim segments 72 and 80 (only the second trim segment 72 is illustrated for simplicity). At the outboard side 50, the recessed ledge 46 includes a vehicle lengthwise oriented vertical wall 180 and a vehicle widthwise oriented vertical wall 182 that faces the panel engaging side 76 of the second trim segment 72. A ridge 184 may be provided that extends vertically along the vertical wall 182. The ridge 184 may be received within a groove 186 provided along the panel facing side 76. In another embodiment, the panel engaging side 76 may include a ridge and the vertical wall may include a groove. The contours of the recessed ledge 46 and the panel engaging side 76 of the second trim segment 72 when a force F is applied, aid in transferring the impact force to the interior panel 26, instead of being absorbed by the self-aligning trim strip 52.

The above-described self-aligning trim strips facilitate their installation by providing a detachable support member that can be used to maintain spacing between trim segments. The detachable support member may be connected to the trim segments by lines of weakness that facilitate manual removal of the detachable support member once the self-aligning trim strips are installed. Datum members may be provided on the detachable support member and/or one or more of the trim segments to facilitate alignment and positioning of the self-aligning trim strips during installation. The self-aligning trim strips may be connected to the interior panels before installation of the interior panels in the vehicle, for example, by a supplier and then sent to a vehicle manufacturer for installation. In some embodiments, the self-aligning trim strips may be retrofit or otherwise installed to an interior panel assembly already located or installed in a vehicle. Any suitable process or process may be used to form the self-aligning trim strips, such as molding and/or machining. For example, the self-aligning trim strip of FIG. 2 may be a single, integrally molded configuration. While an instrument panel assembly is described above, the self-aligning trim strips may be used with any suitable interior panel, such as on the console, doors, etc. or panels outside of vehicles.

Directional terms used herein—for example widthwise, lengthwise, vertical, up, down, right, left, front, back, top, bottom—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of installing a trim strip along an opening in an interior panel for a vehicle, the method comprising:
   positioning the trim strip adjacent an opening in the interior panel, the trim strip comprising:
      a first trim segment having a panel engaging side and an exposed side;
      a second trim segment extending outwardly from the first trim segment at a first end of the first trim segment, the second trim segment having a panel engaging side and an exposed side;
      a third trim segment extending outwardly from the first trim segment at a second, opposite end of the first trim segment, the third trim segment having a panel engaging side and an exposed side; and
      a detachable support member that is connected to the second trim segment along a first line of weakness and to the third trim segment along a second line of weakness, the detachable support member including a datum member arranged and configured to be engaged by a panel datum member;
   engaging the datum member of the detachable support member with a panel datum member thereby aligning the detachable support member relative to the opening;
   controlling spacing of the second and third trim segments using the detachable support member while affixing the panel engaging sides of the first, second and third trim segments along sides of the opening; and
   removing the detachable support member from the second and third trim segments with the first, second and third trim segments remaining affixed along sides of the opening thereby providing a side of the opening without a trim segment.

2. The method of claim 1, wherein the datum member is a first datum member and the panel datum member is a first panel datum member, the method further comprising engaging a second datum member of the first trim segment with a second panel datum member thereby aligning the first datum member relative to the opening.

3. The method of claim 1, wherein the first trim segment includes a plurality of staking projections extending outwardly from the panel engaging side of the first trim segment.

4. The method of claim 3 further comprising inserting the plurality of staking projections within openings positioned along the opening.

5. The method of claim 4, wherein the datum member is a first datum member and one of the plurality of staking members is a second datum member having a length greater than others of the plurality of staking members.

6. The method of claim 1, wherein the step of removing the detachable support member includes detaching the detachable support member from the second and third trim segments at the first and second lines of weakness.

7. The method of claim 1 further comprising connecting the interior panel with the first, second and third trim segments affixed along the sides of the opening to an instrument panel assembly of a vehicle.

8. The method of claim 1, wherein the step of positioning the trim strip comprises positioning the trim strip in a recessed ledge extending about the opening.

9. A trim strip for lining an opening of an interior panel for a vehicle, the trim strip comprising:
   a first trim segment having a panel engaging side and an exposed side;
   a second trim segment extending outwardly from the first trim segment at a first end of the first trim segment, the second trim segment having a panel engaging side and an exposed side;
   a third trim segment extending outwardly from the first trim segment at a second, opposite end of the first trim segment, the third trim segment having a panel engaging side and an exposed side; and
   a detachable support member that is connected to the second trim segment along a first line of weakness and to the third trim segment along a second line of weakness, the detachable support member including a datum member arranged and configured to be engaged by a panel datum member during installation of the trim strip at the opening to align and maintain spacing between the second and third trim segments, the detachable support member being removable from the first and second trim segments along the first and second lines of weakness.

10. The trim strip of claim 9 comprising a plurality of staking projections extending outwardly from the panel engaging side of the first trim segment.

11. The trim strip of claim 10, wherein the datum member is a first datum member and one of the plurality of staking members is a second datum member having a length greater than others of the plurality of staking members.

12. The trim strip of claim 9 comprising at least one staking projection extending outwardly from the panel engaging sides of the second and third trim segments.

13. The trim strip of claim 9, wherein the second trim segment has an end surface and the third trim segment has an end surface, the detachable support member being connected to the second trim segment along the first line of weakness at a location spaced from the end surface of the second trim segment and the detachable support member being connected to the third trim segment along the second line of weakness at a location spaced from the end surface of the third trim segment.

14. The trim strip of claim 9, wherein the panel engaging side of the first trim strip is non-planar forming a reinforcement feature.

15. A method of installing a trim strip along an opening in an interior panel for a vehicle, the method comprising:
   positioning the trim strip in a recessed ledge adjacent an opening in the interior panel, the trim strip comprising:
      a first trim segment having a panel engaging side and an exposed side;
      a second trim segment extending outwardly from the first trim segment at a first end of the first trim segment, the second trim segment having a panel engaging side and an exposed side;
      a third trim segment extending outwardly from the first trim segment at a second, opposite end of the first trim segment, the third trim segment having a panel engaging side and an exposed side; and
      a detachable support member that is connected to the second trim segment along a first line of weakness and to the third trim segment along a second line of weakness;
   engaging the panel engaging side of the first trim segment with the recessed ledge, the recessed ledge including a reinforcement feature comprising an outwardly extending rib supporting the first trim segment along the panel engaging side of the first trim segment.

16. The method of claim 15 further comprising controlling spacing of the second and third trim segments using the detachable support member while affixing the panel engaging sides of the first, second and third trim segments along sides of the opening.

17. The method of claim 15 further comprising removing the detachable support member from the second and third trim segments with the first, second and third trim segments remaining affixed along sides of the opening thereby providing a side of the opening without a trim segment.

18. The method of claim 15 further comprising engaging a datum member of the detachable support member with a panel datum member thereby aligning the detachable support member relative to the opening.

19. The method of claim 18, wherein the datum member is a first datum member and the panel datum member is a first panel datum member, the method further comprising engaging a second datum member of the first trim segment with a second panel datum member thereby aligning the first datum member relative to the opening.

20. The method of claim 18 further comprising connecting the interior panel with the first, second and third trim segments affixed to the recessed ledge to an instrument panel assembly of a vehicle.

\* \* \* \* \*